Figure 1:
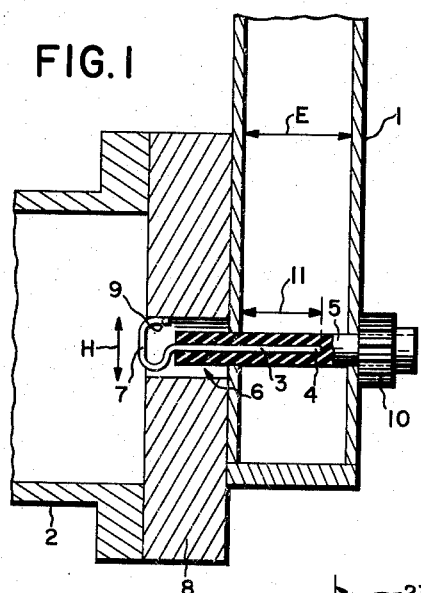

Oct. 26, 1965   J. C. EVERITT   3,214,684
BROADBAND VARIABLE COUPLER FOR MICROWAVE ENERGY
Filed Oct. 3, 1962   2 Sheets-Sheet 1

INVENTOR.
JOHN C. EVERITT
BY
ATTORNEY

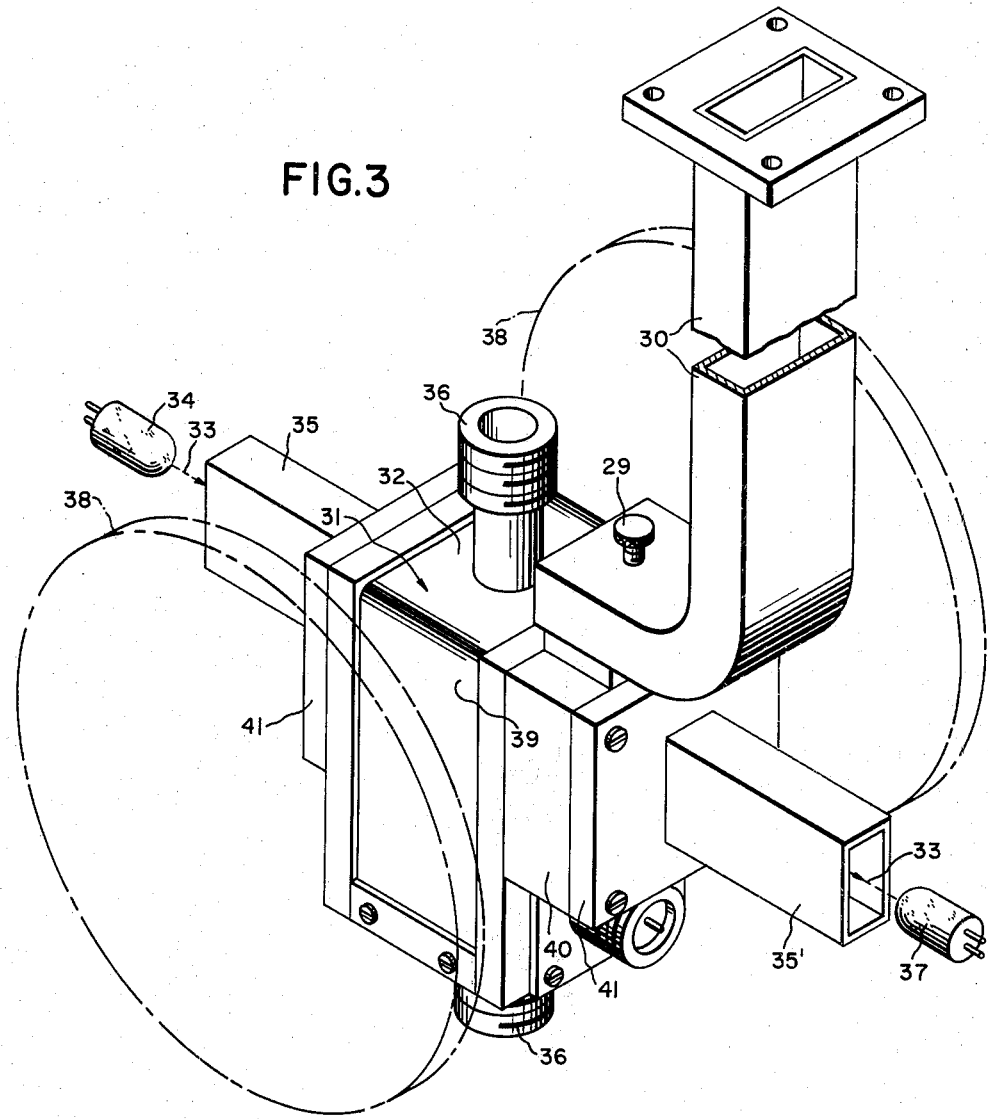

United States Patent Office 3,214,684
Patented Oct. 26, 1965

3,214,684
BROADBAND VARIABLE COUPLER FOR
MICROWAVE ENERGY
John C. Everitt, San Jose, Calif., assignor to Varian Associates, Palo Alto, Calif., a corporation of California
Filed Oct. 3, 1962, Ser. No. 228,113
15 Claims. (Cl. 324—.5)

The present invention relates in general to microwave couplers, and in particular to novel devices for varying the coupling of microwave energy to a cavity resonator or waveguide transmission line over an extremely wide range by means of a rotatable loop, especially in conjunction with electron paramagnetic resonance apparatus.

It is well known that the spin resonances of electrons may be studied by placing a paramagnetic sample within a magnetic field-modulated cavity resonator. A difficulty with prior art iris means for coupling to such a resonator is that a single iris coupler does not have a sufficient range of coupling coefficients so that the unloaded resonator may be undercoupled and/or highly overcoupled as is required in order to permit critical coupling to the loaded sample-containing resonator. In order to observe the resonances of both non-lossy and very lossy samples, it is necessary, therefore, to substitute different iris couplers having a range of coupling coefficients such that it is possible to adjust the coupler for critical coupling to the loaded cavity for every sample. A single coupling device is needed covering a wide range of coupling coefficients which will replace several iris couplers used for this purpose so that it will be unnecessary to substitute iris couplers whenever relatively lossy samples are replaced by non-lossy samples in a cavity resonator.

One object, therefore, of the present invention is the provision of a coupler which is used to couple microwave energy into a cavity resonator in which either non-lossy or highly lossy paramagnetic samples may be disposed.

A coupling device is needed, moreover, which is capable not only of a wide range of coupling coefficients at a particular frequency, but also is sufficiently broad-band so that critical coupling to a loaded resonator may be achieved when the frequency at which the resonator operates is varied. A problem with coupling loops is that they are narrow band devices as are coupling probes.

Another object of the present invention, therefore, is the provision of means for broad-band coupling of microwave energy to a cavity resonator, which coupling ranges for an unloaded cavity resonator from null coupling, corresponding to a zero coupling coefficient, to a high degree of overcoupling, corresponding to large coupling coefficients. A feature of the present invention for achieving this object is a combination of inductive coupling and capacitive coupling within a single unitary coupling structure.

Another difficulty with some prior art couplers for use on cavity resonators suitable for electron paramagnetic resonance applications is that in order to adjust the coupling it is necessary to remove the cavity from between the pole pieces of the electromagnet which is used to establish a static magnetic field within the cavity.

One feature of the present invention, therefore, is the provision of accessible coupling in a vertical plane lying between the pole pieces of an electromagnet.

Still another difficulty with other prior art couplers is that the coupling means are disposed in end or side walls so as to preclude light transmission through the cavity resonator in a horizontal plane. However, it is very important in certain electron resonance experiments to be able to transmit light through a cavity resonator in order that optical absorption measurements can be made simultaneously with the microwave absorption measurements.

One feature of the present invention, therefore, is the provision of variable coupling means disposed accessibly above a waveguide transmission line, which is mounted on top of a cavity resonator, so that light may be transmitted through the cavity in a horizontal plane between the pole pieces of an electromagnet.

Another difficulty with many prior art iris couplers is that their performance is unreliable due to intermittent electrical contact between the metal parts of their screw assemblies.

One feature of the present invention, therefore, is the provision of means for maintaining constant electrical contact between those metal parts which correspond to iris screw assemblies.

Figure 1A:
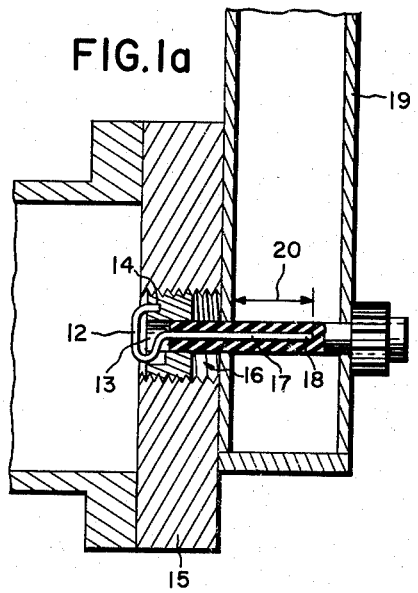
Figure 2:
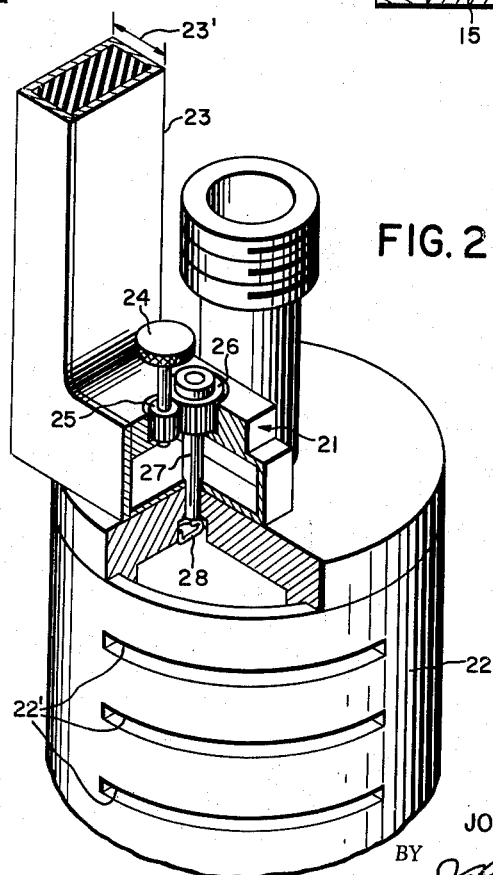

These and other features and advantages of the present invention will be more apparent after a perusal of the following specification taken in connection with the accompanying drawings wherein:

FIG. 1 is a cross-sectional view of a coupler in accordance with the present invention by means of which microwave energy in a rectangular waveguide is coupled to a resonant cavity, FIG. 1a is a cross-sectional view of another coupler in accordance wtih the present invention by means of which a rectangular waveguide is coupled to a resonant cavity, FIG. 2 is an isometric view, partially broken away, of a microwave structure in accordance with the present invention for transferring microwave energy between a rectangular transmission waveguide and a cylindrical cavity resonator which is suitable for electron paramagnetic resonance studies, and which is resonant in the TE$_{011}$ microwave mode, for example, and FIG. 3 is an isometric view of a microwave structure in accordance with the present invention for transferring microwave energy between a rectangular transmission waveguide and a rectangular cavity resonator and for enabling simultaneous microwave and optical absorption measurements. The cavity resonator is suitable for electron paramagnetic resonance studies and is resonant in the TE$_{102}$ microwave mode, for example.

Referring now to FIG. 1, a coupler for transferring energy between rectangular transmission waveguide 1 and cavity resonator 2 is shown. Waveguide 1 is capacitively coupled by means of wire 3, one end of which comprises an electrical probe 4 extending into the waveguide centrally along the axis of cylindrical dielectric shaft 5. The middle section of wire 3 extends through a short section of fast wave supporting structure 6 formed in the end wall of the cavity resonator 2. The other end of wire 3 comprises a coupling loop 7 for inductive coupling to cavity resonator 2.

The difficulty of intermittent contact experienced with prior-art metal screw assemblies is eliminated because metal wire loop 7 is shaped so as to press against apertured end-wall coupling plate 8 at annular contact area 9 with considerable tension, thereby assuring continuous electrical contact between the central conductor 3 and outer conductor 8 of fast wave structure 6.

A feature of the coupler is that loop 7 may be rotated by external means so that the plane of the loop is either perpendicular or parallel to the magnetic field direction within the cavity resonator 2 without altering the capacitive coupling to waveguide 1. When the plane of the loop is perpendicular to the magnetic field direction within the cavity resonator, there is maximum coupling between the cavity resonator and the waveguide. When the plane of the loop is parallel to the magnetic field direction within the cavity resonator, there is minimum coupling between the cavity resonator and the waveguide.

Since wire 3 is cemented to shaft 5, whenever reduction gear 10 is turned by means of a pinion (not shown), rotation of loop 7 is accomplished. Provision of a reduction gear is not essential for operation of the device.

Gear 10 allows loop 7 to be rotated more gradually than would be possible if shaft 5 were turned directly by hand.

In this embodiment, one adjustment of the probe penetration depth 11 is made for maximum power transmission over a broad frequency range. The coupler remains peaked for maximum power transmission after this initial adjustment of the probe depth, since the position of probe 4 in waveguide 1 does not vary when shaft 5 is rotated. An important feature of the present invention is that if the resonant frequency of cavity resonator 2 is altered by means of a tuning plunger, not shown, the change in the degree of coupling due to loop 7 is equal and opposite to that due to probe 4 to a first order of approximation. Thus the unique capability of this invention for coupling to cavities in which either non-lossy or highly lossy samples may be disposed is preserved when, as is required in many applications, the frequency of the cavity resonator is varied.

In another embodiment shown in FIG. 1a, the coupling loop 12 is soldered or brazed to a threaded cylindrical sleeve 13 at point 14. Sleeve 13 contacts end-wall coupling plate 15 which serves as the outer conductor of a short section of fast wave structure 16. In this embodiment rotation of wire 17 advances or withdraws probe 18 from waveguide 19, thus increasing or decreasing probe penetration depth 20 and thereby changing the degree of capacitive coupling. In this case it may be necessary to readjust the probe penetration depth periodically to insure maximum power transmission.

Referring now to FIG. 2, a microwave structure according to the present invention is shown in which the coupler 21 is used to transmit energy to and from a cylindrical cavity resonator 22 through a rectangular waveguide 23 which is filled with dielectric material in order to permit transmitting microwave energy in the $TE_{01}$ microwave mode through a small rectangular cross section. Cavity 22 is resonant in the $TE_{011}$ microwave mode and is suitable for studying the spin resonances of electrons in a sample disposed in the cavity. It is advantageous to use this coupler in this environment instead of iris coupling into the cavity side wall since closely-spaced magnet pole pieces must be rotated about the center of the cavity resonator in certain experiments on electron paramagnetic resonance effects, the side wall advantageously being unobstructed. Circumferential slots 22′ optionally may be provided in the side wall to provide light irradiation of the sample, whereupon the unobstructed side wall advantageously permits irradiation throughout 360° of the cavity circumference.

The degree of coupling may be varied by manually rotating key 24 which in turning pinion 25 turns gear 26 and cylindrical dielectric shaft 27 thereby producing rotation of coupling loop 28. Since the magnetic field adjacent to the end plate of a $TE_{011}$ cylindrical cavity is radial, maximum coupling is achieved when the plane of the coupling loop is perpendicular to the cavity radial direction; that is, when the plane of the loop is parallel to the narrow dimension 23′ of waveguide 23.

The use of applicant's device is especially advantageous in connection with electron paramagnetic resonance spectrometer applications requiring an accessory device which may be attached to a standard spectrometer cavity in order to permit optical transmission studies. An embodiment of applicant's coupler in this environment is shown in FIG. 3. Coupled 29 permits coupling of microwave energy from rectangular transmission waveguide 30 into rectangular cavity resonator 31 through top wall 32 in order that light may be transmitted and detected through the end walls along direction 33 of the cavity resonator. A beam of light from light source 34 enters the cavity through waveguide stack 35, passes through an aqueous sample (not shown) disposed in the median plane of the cavity defined by access stacks 36 and is detected upon leaving the cavity through waveguide stack 35′ by photocell 37. Magnet pole pieces 38 are disposed adjacent to the wide side walls 39 of the cavity resonator. In this embodiment, half wavelength section 40, upon which coupler 29 is mounted, is detachable from cavity 31 as well as the combination of end plates 41 and stacks 35 and 35′ which are waveguides beyond cut-off. This permits the cavity to be used without these attachments for experiments not involving the monitoring of transmitted light, as is more fully explained in the copending application Serial No. 244,406 of David E. Gielow, and assigned to applicant's assignee.

Since many changes can be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A microwave device, comprising: a microwave energy transmission means with at least two coupled connections; a probe at one of said connections, said probe being adapted for capacitive coupling to a waveguide; a loop at the other of said connections, said loop being adapted for inductive coupling to a wave supporting structure; said loop and said probe comprising opposite ends of a single conducting wire that extends from said waveguide to said wave supporting structure; and means for enabling rotation of said loop, whereby the inductive coupling between said waveguide and said wave supporting structure is varied over a very wide range.

2. A microwave coupler, comprising: a short section of first fast wave supporting structure; a coupling probe fixedly disposed at one end of said first wave supporting structure in axial alignment therewith and connected thereto, said probe being adapted for coupling to a wave transmission structure; a coupling loop fixedly disposed at the other end of said wave supporting structure in axial alignment therewith and connected thereto, said loop and said probe comprising opposite ends of a single conducting wire that extends through said first fast wave supporting structure, said loop being adapted for coupling to a second wave supporting structure; and means enabling axial rotation of said loop for providing variable inductive coupling to said second wave supporting structure while maintaining constant capacitive coupling to said wave transmission structure.

3. A coupler according to claim 2 wherein said second wave supporting structure is a cavity resonator.

4. A coupler according to claim 2 wherein said coupling loop end of said conducting wire is adapted to contact the outer conducting surface of said first wave supporting structure under tension.

5. A coupler according to claim 2 and further including gear reduction means for external rotation of said coupling loop.

6. A coupler according to claim 4 wherein said coupling loop end is fixedly secured to the outer conducting surface of said first wave supporting structure.

7. A unitary microwave coupling structure comprising a short section of wave supporting structure and a continuous metallic conducting wire, one end of said wire comprising a coupling loop for inductive coupling to an unloaded rectangular cavity resonator wherein various paramagnetic samples may be disposed loading said resonator, the middle portion of said wire extending through said wave supporting structure, and the other end of said wire comprising a coupling probe for capacitive coupling to a rectangular waveguide transmission line, for providing broad-band coupling with a wide range of coupling coefficients to said unloaded resonator whereby critical coupling to said resonator loaded with any of said samples is achieved for a very wide range of lossiness of said sample.

8. A unitary microwave coupling structure comprising a short section of wave supporting structure and a continuous metallic conducting wire, one end of said wire comprising a coupling loop for inductive coupling to an unloaded open cylindrical cavity resonator wherein various paramagnetic samples may be disposed loading said resonator, the middle portion of said wire extending through said wave supporting structure, and the other end of said wire comprising a coupling probe for capacitive coupling to a rectangular waveguide transmission line, for providing broad-band coupling with a wide range of coupling coefficients to said unloaded cylindrical resonator, whereby critical coupling to said resonator loaded with any of said samples is possible throughout a very wide range of lossiness of said samples.

9. A microwave structure, comprising: a cavity resonator having a wall structure with an aperture therein; a continuous metallic conducting wire structure extending axially through said aperture; a wave transmission structure, one end of said wire structure extending into said structure for capacitive probe coupling therewith, and the other end of said wire structure extending into said cavity resonator and being formed into a loop for inductive coupling thereto; and means enabling axial rotation of said wire structure for providing variable broadband coupling to said cavity resonator while maintaining constant capacitive coupling to said wave transmission structure.

10. A microwave structure according to claim 9 wherein said cavity resonator is rectangular with said aperture being in the top wall of said resonator, and further including means providing axially-aligned openings in the end walls of said resonator whereby a beam of optical radiation may be transmitted therethrough, the side walls of said resonator being unobstructed so that said resonator may be placed between the closely-spaced poles of a magnet.

11. A microwave structure according to claim 9 wherein said cavity resonator is cylindrical with said aperture being in an end wall thereof, the side wall of said cavity resonator being unobstructed so that said resonator may be mounted for mutual axial rotation between the closely-spaced pole pieces of a magnet.

12. A microwave structure according to claim 9 wherein said cavity resonator is cylindrical with said aperture being in an end wall thereof, the side wall of said cavity resonator being unobstructed and further including a plurality of circumferentially extending slots in said side wall whereby the interior of said resonator may be optically irradiated throughout 360 degrees of cavity circumference.

13. A unitary microwave coupling structure comprising coupling-plate means with an apertured cylindrical space extending therethrough, said space and the walls of said coupling-plate means adjacent said space comprising a short section of wave supporting structure between a cavity resonator and a waveguide transmission line, and a continuous metallic conducting wire, one end of said wire comprising a coupling loop for inductive coupling to said cavity resonator, the middle portion of said wire extending axially through said apertured space, and the other end of said wire comprising a coupling probe for capacitive coupling to said waveguide transmission line, for providing broad-band coupling with a very wide range of coupling coefficients to said cavity resonator.

14. A coupling structure according to claim 13 wherein said cavity resonator is cylindrical and resonant in the $TE_{011}$ microwave mode.

15. A coupling structure according to claim 13 wherein said cavity resonator is rectangular and resonant in the $TE_{102}$ microwave mode.

References Cited by the Examiner

UNITED STATES PATENTS

| | | | |
|---|---|---|---|
| 2,426,992 | 9/47 | Folland et al. | 333—83 X |
| 2,489,092 | 11/49 | Larrick | 333—83 X |
| 2,501,052 | 3/50 | Herlin | 333—83 X |
| 2,880,399 | 3/59 | Murphy | 333—21 X |
| 2,884,524 | 4/59 | Dicke | 324—0.5 |
| 3,090,012 | 5/63 | Hsu | 333—83 |
| 3,133,227 | 5/64 | Brown et al. | 333—95 |

OTHER REFERENCES

Gordon: Review of Scientific Instruments, vol. 32, No. 6, June 1961, pages 658–661 incl.

CHESTER L. JUSTUS, *Primary Examiner.*

MAYNARD R. WILBUR, *Examiner.*